US008939841B2

(12) United States Patent
Englman et al.

(10) Patent No.: US 8,939,841 B2
(45) Date of Patent: Jan. 27, 2015

(54) WAGERING GAME WITH ALTERNATING PICKS

(75) Inventors: Allon G. Englman, Chicago, IL (US); Mark Gagner, West Chicago, IL (US); Michael W. Mastropietro, Chicago, IL (US); Paul McInerny, Chicago, IL (US); Larry J. Pacey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 211 days.

(21) Appl. No.: 13/417,735

(22) Filed: Mar. 12, 2012

(65) Prior Publication Data

US 2012/0172113 A1 Jul. 5, 2012

Related U.S. Application Data

(63) Continuation of application No. 11/333,954, filed on Jan. 17, 2006, now Pat. No. 8,133,120.

(60) Provisional application No. 60/644,731, filed on Jan. 18, 2005.

(51) Int. Cl.
*A63F 13/00* (2014.01)
*G07F 17/32* (2006.01)

(52) U.S. Cl.
CPC ............ *G07F 17/3258* (2013.01); *G07F 17/32* (2013.01)
USPC ............................................................ 463/42

(58) Field of Classification Search
USPC ......................................... 463/16–22, 26–28
See application file for complete search history.

(56) References Cited

U.S. PATENT DOCUMENTS

| | | | |
|---|---|---|---|
| 4,624,459 | A | 11/1986 | Kaufman |
| 4,837,728 | A | 6/1989 | Barrie et al. |
| 4,948,134 | A | 8/1990 | Suttle et al. |
| 5,116,055 | A | 5/1992 | Tracy |
| 5,249,800 | A | 10/1993 | Hilgendorf et al. |
| 5,275,400 | A | 1/1994 | Weingardt et al. |

(Continued)

FOREIGN PATENT DOCUMENTS

| | | |
|---|---|---|
| DE | 19624321 | 3/2002 |
| DE | 19515983 | 4/2003 |

(Continued)

OTHER PUBLICATIONS

"Easy Riches" by Sigma Game, Strictly Slots, 1 page (Aug. 2001).
"Millioniser" by Glenn Haussman, Strictly Slots, pp. 50-53 (Mar. 2004).
"Big Games Safari", IGT, 24 pages (2000).
"Super Spin Wheel of Fortune", IGT, Global Gaming Expo, 1 page (2004).
"New '97 Games", International Gaming & Wagering Business, 24 pages (Mar. 1997).

*Primary Examiner* — David L Lewis
*Assistant Examiner* — Eric M Thomas
(74) *Attorney, Agent, or Firm* — Nixon Peabody LLP

(57) ABSTRACT

Method and system are disclosed for conducting a wagering game having increased excitement and enjoyment over existing wagering games. The method and system involve a bank of wagering game terminals connected to a bank controller. Each wagering game terminal allows players to play a basic wagering game that is independent of other wagering game terminals. The wagering game terminals also allow players to play a bonus game where players take turns playing to win a portion of a jackpot. The portion awarded to each player may be the actual amount won by that player, or it may be a percentage of the entire jackpot based on the actual amount won by the player relative to other players. In one implementation, only players at wagering game terminals that exceed a minimum level of wagering activity may play the bonus game.

20 Claims, 8 Drawing Sheets

(56) References Cited

U.S. PATENT DOCUMENTS

| | | | | |
|---|---|---|---|---|
| 5,280,909 | A | 1/1994 | Tracy | |
| 5,344,144 | A | 9/1994 | Canon | |
| 5,377,973 | A | 1/1995 | Jones et al. | |
| 5,393,057 | A | 2/1995 | Marnell, II | |
| 5,524,888 | A | 6/1996 | Heidel | |
| 5,544,892 | A | 8/1996 | Breeding | |
| 5,564,700 | A | 10/1996 | Celona | |
| 5,580,063 | A | 12/1996 | Edwards | |
| 5,580,309 | A | 12/1996 | Piechowiak et al. | |
| 5,611,730 | A | 3/1997 | Weiss | |
| 5,645,486 | A | 7/1997 | Nagao et al. | |
| 5,655,961 | A | 8/1997 | Acres et al. | |
| 5,766,076 | A | 6/1998 | Pease et al. | |
| RE35,864 | E | 7/1998 | Weingardt | |
| 5,779,549 | A | 7/1998 | Walker et al. | |
| 5,816,918 | A | 10/1998 | Kelly et al. | |
| 5,823,874 | A | 10/1998 | Adams | |
| 5,830,063 | A | 11/1998 | Byrne et al. | |
| 5,848,932 | A | 12/1998 | Adams | |
| 5,855,515 | A | 1/1999 | Pease et al. | |
| 5,876,284 | A | 3/1999 | Acres et al. | |
| 5,885,158 | A | 3/1999 | Torango et al. | |
| 5,941,773 | A | 8/1999 | Harlick | |
| 5,975,528 | A | 11/1999 | Halaby | |
| 6,007,427 | A | 12/1999 | Wiener et al. | |
| 6,012,982 | A | 1/2000 | Piechowiak et al. | |
| 6,039,648 | A | 3/2000 | Guinn et al. | |
| 6,047,963 | A | 4/2000 | Pierce et al. | |
| 6,077,162 | A | 6/2000 | Weiss | |
| 6,089,977 | A | 7/2000 | Bennett | |
| 6,089,980 | A | 7/2000 | Gauselmann et al. | |
| 6,102,474 | A | 8/2000 | Daley | |
| 6,102,798 | A | 8/2000 | Bennett et al. | |
| 6,102,799 | A | 8/2000 | Stupak | |
| 6,110,043 | A | 8/2000 | Olsen | |
| 6,139,013 | A | 10/2000 | Pierce et al. | |
| 6,142,872 | A | 11/2000 | Walker et al. | |
| 6,146,273 | A | 11/2000 | Olsen | |
| 6,155,925 | A | 12/2000 | Giobbi et al. | |
| 6,158,741 | A | 12/2000 | Koelling | |
| 6,159,097 | A | 12/2000 | Gura | |
| 6,168,523 | B1 | 1/2001 | Piechowiak et al. | |
| 6,203,010 | B1 | 3/2001 | Jorasch et al. | |
| 6,206,374 | B1 | 3/2001 | Jones | |
| 6,206,782 | B1 | 3/2001 | Walker et al. | |
| 6,210,275 | B1 | 4/2001 | Olsen | |
| 6,210,277 | B1 | 4/2001 | Stefan | |
| 6,217,448 | B1 | 4/2001 | Olsen | |
| 6,220,593 | B1 | 4/2001 | Pierce et al. | |
| 6,224,482 | B1 | 5/2001 | Bennett et al. | |
| 6,224,484 | B1 | 5/2001 | Okuda et al. | |
| 6,231,445 | B1 | 5/2001 | Acres | |
| 6,254,483 | B1 | 7/2001 | Acres | |
| 6,312,332 | B1 | 11/2001 | Walker et al. | |
| 6,315,660 | B1 | 11/2001 | DeMar et al. | |
| 6,319,125 | B1 | 11/2001 | Acres | |
| 6,319,127 | B1 | 11/2001 | Walker et al. | |
| 6,336,859 | B2 | 1/2002 | Jones et al. | |
| 6,336,862 | B1 | 1/2002 | Byrne et al. | |
| 6,345,824 | B1 | 2/2002 | Selitzky | |
| 6,358,149 | B1 | 3/2002 | Schneider et al. | |
| 6,361,441 | B1 | 3/2002 | Walker et al. | |
| 6,364,768 | B1 | 4/2002 | Acres et al. | |
| 6,375,567 | B1 | 4/2002 | Acres | |
| 6,375,568 | B1 | 4/2002 | Roffman et al. | |
| 6,416,408 | B2 | 7/2002 | Tracy et al. | |
| 6,416,409 | B1 | 7/2002 | Jordan | |
| 6,422,940 | B1 | 7/2002 | Walker et al. | |
| 6,431,983 | B2 | 8/2002 | Acres | |
| 6,435,968 | B1 | 8/2002 | Torango | |
| 6,439,995 | B1 | 8/2002 | Hughs-Baird et al. | |
| 6,454,266 | B1 | 9/2002 | Breeding et al. | |
| 6,482,089 | B2 | 11/2002 | DeMar et al. | |
| 6,506,117 | B2 | 1/2003 | DeMar et al. | |
| 6,508,707 | B2 | 1/2003 | DeMar et al. | |
| 6,517,433 | B2 | 2/2003 | Loose et al. | |
| 6,520,855 | B2 | 2/2003 | DeMar et al. | |
| 6,589,115 | B2 | 7/2003 | Walker et al. | |
| 6,592,460 | B2 | 7/2003 | Torango | |
| 6,599,186 | B1 | 7/2003 | Walker et al. | |
| 6,599,188 | B2 | 7/2003 | Hirsch et al. | |
| 6,599,193 | B2 | 7/2003 | Baerlocher et al. | |
| 6,609,973 | B1 | 8/2003 | Weiss | |
| 6,648,753 | B1 | 11/2003 | Tracy et al. | |
| 6,648,762 | B2 | 11/2003 | Walker et al. | |
| 6,692,354 | B2 | 2/2004 | Tracy et al. | |
| 6,712,695 | B2 | 3/2004 | Mothwurf et al. | |
| 6,712,699 | B2 | 3/2004 | Walker et al. | |
| 6,733,390 | B2 | 5/2004 | Walker et al. | |
| 6,790,141 | B2 | 9/2004 | Muir et al. | |
| 6,837,793 | B2 | 1/2005 | McClintic | |
| 6,887,159 | B2 | 5/2005 | Leen et al. | |
| 2001/0036857 | A1 * | 11/2001 | Mothwurf et al. | 463/25 |
| 2002/0055381 | A1 * | 5/2002 | Tarantino | 463/20 |
| 2002/0138594 | A1 | 9/2002 | Rowe | |
| 2002/0151345 | A1 | 10/2002 | Byrne | |
| 2002/0155874 | A1 | 10/2002 | Byrne | |
| 2003/0027618 | A1 | 2/2003 | Byrne | |
| 2003/0036430 | A1 | 2/2003 | Cannon | |
| 2003/0045337 | A1 | 3/2003 | Byrne | |
| 2003/0047874 | A1 | 3/2003 | Leen et al. | |
| 2003/0050106 | A1 | 3/2003 | Lyfoung | |
| 2003/0064776 | A1 | 4/2003 | Byrne | |
| 2003/0064807 | A1 | 4/2003 | Walker et al. | |
| 2003/0114218 | A1 | 6/2003 | McClintic | |
| 2003/0119576 | A1 | 6/2003 | McClintic et al. | |
| 2003/0148808 | A1 | 8/2003 | Price | |
| 2003/0181231 | A1 | 9/2003 | Vancura et al. | |
| 2003/0186733 | A1 | 10/2003 | Wolf et al. | |
| 2003/0216166 | A1 | 11/2003 | Baerlocher et al. | |
| 2003/0222402 | A1 | 12/2003 | Olive | |
| 2003/0224852 | A1 | 12/2003 | Walker | |
| 2003/0228899 | A1 | 12/2003 | Evans | |
| 2003/0236116 | A1 | 12/2003 | Marks et al. | |
| 2004/0002377 | A1 * | 1/2004 | Staw et al. | 463/25 |
| 2004/0009808 | A1 | 1/2004 | Gauselmann | |
| 2004/0009811 | A1 | 1/2004 | Torango | |
| 2004/0038741 | A1 | 2/2004 | Gauselmann | |
| 2004/0048644 | A1 | 3/2004 | Gerrard et al. | |
| 2004/0087368 | A1 | 5/2004 | Gauselmann | |
| 2004/0106448 | A1 | 6/2004 | Gauselmann | |
| 2004/0132524 | A1 | 7/2004 | Ramstad et al. | |
| 2004/0204226 | A1 | 10/2004 | Foster et al. | |
| 2004/0204235 | A1 | 10/2004 | Walker et al. | |
| 2004/0235552 | A1 | 11/2004 | Gauselmann | |
| 2004/0242297 | A1 | 12/2004 | Walker et al. | |
| 2004/0242303 | A1 | 12/2004 | Walker et al. | |
| 2004/0242306 | A1 | 12/2004 | Tarantino | |
| 2005/0014554 | A1 | 1/2005 | Walker et al. | |
| 2005/0026674 | A1 | 2/2005 | Wolf et al. | |
| 2005/0148382 | A1 | 7/2005 | Fox | |
| 2005/0187008 | A1 | 8/2005 | Nakajima | |
| 2005/0192073 | A1 | 9/2005 | Nakajima | |
| 2005/0282628 | A1 | 12/2005 | Beatty et al. | |
| 2006/0068893 | A1 | 3/2006 | Jaffe et al. | |

FOREIGN PATENT DOCUMENTS

| | | |
|---|---|---|
| EP | 0521599 | 1/1993 |
| GB | 2153572 | 8/1985 |
| GB | 2181589 | 4/1987 |
| GB | 2242300 | 9/1991 |
| GB | 2313792 | 12/1997 |
| GB | 2333880 | 8/1999 |
| WO | 99/03078 | 1/1999 |
| WO | 99/19037 | 4/1999 |
| WO | 01/33478 | 5/2001 |
| WO | 03/026754 | 4/2003 |
| WO | 03/083789 | 10/2003 |

* cited by examiner

WAGERING GAME WITH ALTERNATING PICKS

CROSS-REFERENCE TO RELATED APPLICATION

This application claims priority to U.S. patent application Ser. No. 11/333,954, filed on Jan. 17, 2006 and issued as U.S. Pat. No. 8,133,120 on Mar. 13, 2012, which claims priority to U.S. Provisional Application No. 60/644,731, filed on Jan. 18, 2005, the contents of these applications being incorporated entirely herein by reference.

FIELD OF THE INVENTION

The present invention relates generally to wagering game terminals and, more particularly, to a method and system of conducting a wagering game in which players at several wagering game terminals compete against each other to win portions of a jackpot.

BACKGROUND OF THE INVENTION

Wagering game terminals, such as slot machines, video poker machines, and the like, have been a cornerstone of the gaming industry for several years. The popularity of such terminals among players generally depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are most likely to be attracted to the more entertaining and exciting terminal. Consequently, wagering game terminal operators strive to employ the most entertaining and exciting terminals available because such terminals attract frequent play and, hence, increase profitability for the operators. Thus, in the highly competitive wagering game terminal industry, there is a continuing need to develop new types of games, or improvements to existing games, that will enhance the entertainment value and excitement associated with the games.

One concept that has been successfully employed in existing wagering game terminals to enhance player entertainment is the use of progressive games. In the gaming industry, a "progressive" game involves collecting coin-in data from participating wagering game terminals (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating wagering game terminal. If the wagering game terminal is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

Another concept that is often employed is a secondary or "bonus" game played in conjunction with a "basic" game. The bonus game may include any type of game, either similar to or entirely different from the basic game, and is initiated by the occurrence of certain pre-selected events or outcomes of the basic game. The addition of such a bonus game has been found to produce a significantly higher level of player excitement than the basic game alone because it provides an additional chance to play, which increases the player's overall expectation of winning.

In existing wagering game terminals, the basic game and the bonus game are played on an individual, stand-alone basis. That is, each player plays and wins at his or her own wagering game terminal with little or no participation from other players at other wagering game terminals. There are presently no arrangements where players at several wagering game terminals may play in competition against each other. It has been observed, however, that players derive a substantial amount of excitement and enjoyment from the active participation of other players.

Accordingly, what is needed is a wagering game terminal that is capable of providing increased excitement and entertainment value over existing wagering game terminals. More specifically, what is needed is a wagering game terminal that can provide a wagering game in which a player may compete against other players.

SUMMARY OF THE INVENTION

The present invention is directed to a method and system for conducting a wagering game having increased excitement and enjoyment over existing wagering games. The method and system of the invention involves a bank of wagering game terminals connected to a bank controller. Each wagering game terminal allows players to play a basic wagering game that is independent of other wagering game terminals. The wagering game terminals also allow players to play a bonus game where players take turns playing to win a portion of a jackpot. The portion awarded to each player may be the actual amount won by that player, or it may be a percentage of the entire jackpot based on the actual amount won by the player relative to other players. In one implementation, only players at wagering game terminals that exceed a minimum level of wagering activity may play the bonus game.

In general, in one aspect, the invention is directed to a wagering game system. The wagering game system comprises a plurality of wagering game terminals, each wagering game terminal capable of conducting a wagering game in which an outcome is randomly selected from a plurality of outcomes, including a special-event outcome. The wagering game system further comprises a network to which the wagering game terminals are connected, the network initiating a special-event game on eligible ones of the wagering game terminals upon occurrence of the special-event outcome as the randomly selected outcome on one of the wagering game terminals. The special-event game allows players at the eligible ones of the wagering game terminals to take turns playing to win a portion of a special-event jackpot.

In general, in another aspect, the invention is directed to a method of operating wagering game terminals. The method comprises the step of conducting a wagering game on a plurality of wagering game terminals, each wagering game having an outcome that is randomly selected from a plurality of outcomes, including a special-event outcome. The method further comprises the step of displaying a special-event game on eligible ones of the wagering game terminals upon occurrence of the special-event outcome as the randomly selected outcome on any wagering game terminal. Players at the eligible ones of the wagering game terminals are sequentially informed to play the special-event game, and only one player at a time is allowed to play the special-event game.

In general, in still another aspect, the invention is directed to a wagering terminal. The wagering game terminal comprises a wager input for accepting a wager from a player at the wagering game terminal and a display unit for displaying a wagering game in which an outcome is randomly selected from a plurality of outcomes, including a bonus outcome. The bonus outcome triggers a bonus game on the wagering game terminal in which the player alternates turns playing with other players at other wagering game terminals to win a portion of a jackpot.

In general, in yet another aspect, the invention is directed to a method of apportioning a jackpot amongst multiple wagering game terminals. The method comprises the step of conducting a wagering game on the wagering game terminals where each wagering game has an outcome that is randomly selected from a plurality of outcomes, including a bonus outcome. Upon occurrence of the bonus outcome as the randomly selected outcome on any wagering game terminal, a bonus game is initiated on eligible ones of the wagering game terminals in which players take a turn playing. During each player's turn playing the bonus game, the player is awarded a portion of the jackpot or terminated the player from the bonus game.

In general, in still another aspect, the invention is directed to a wagering game system. The system comprises a plurality of wagering game terminals linked together, each wagering game terminal capable of causing a special-event game to be started on eligible ones of the plurality of wagering game terminals upon occurrence of a special-event on the wagering game terminal. During the special-event game, all players at the eligible ones of the plurality of wagering game terminals play the same special-event game to win a portion of a special-event jackpot.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
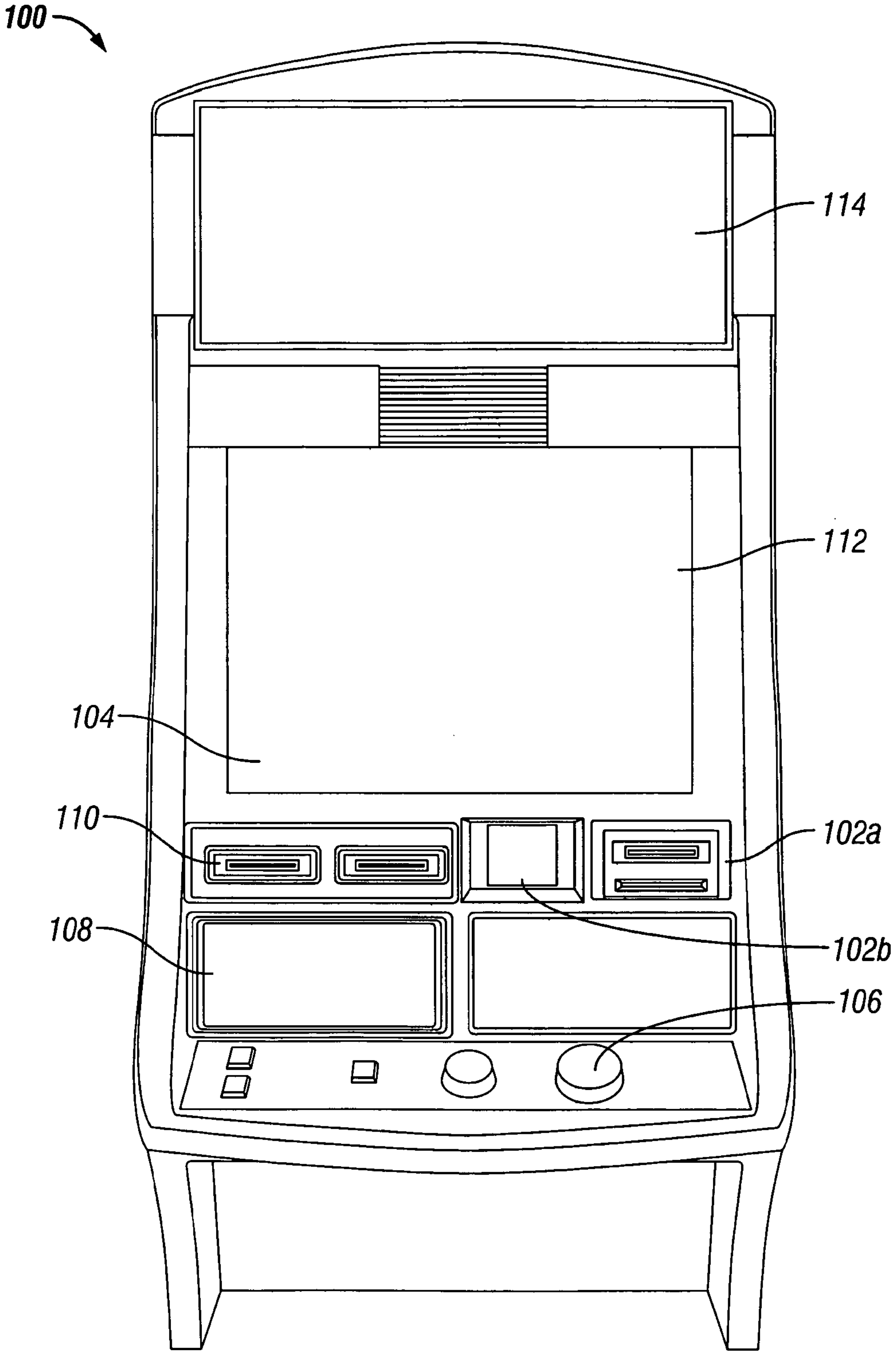
FIG. 1 illustrates a perspective view of a wagering game terminal according to one embodiment of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As alluded to above, embodiments of the invention provide a system and method for playing a wagering game where players at several wagering game terminals may compete against each other in a bonus game for portions of a jackpot. Whether a player may participate in the bonus game is based on the amounts wagered at the wagering game terminals. Player identification and tracking are not necessary, although these aspects may certainly be incorporated into the invention. In most embodiments, players participate in the bonus game on an anonymous basis with respect to the wagering game terminals.

FIG. 1 shows a perspective view of an exemplary wagering game terminal 100 according to embodiments of the invention. The wagering game terminal 100 may be operated as a stand-alone terminal, or it may be connected to a network of wagering game terminals. Further, the wagering game terminal 100 may be any type of wagering game terminal and may have varying structures and methods of operation. For example, the wagering game terminal 100 may be a mechanical wagering game terminal configured to play mechanical slots, or it may be an electromechanical or electrical wagering game terminal configured to play a video casino game, such as blackjack, slots, keno, poker, etc. In the example shown, the wagering game terminal 100 is a video slot machine.

As shown, the wagering game terminal 100 includes input devices, such as a wager acceptor 102 (shown as a card wager acceptor 102*a* and a cash wager accepter 102*b*), a touch screen 104, a push-button panel 106, a payout mechanism 108, and an information reader 110. The wagering game terminal 100 further includes a main display 112 for displaying information about the basic wagering game and, in some embodiments, a secondary display 114 for displaying a pay table and/or game-related information or other entertainment features. While these typical components found in the wagering game terminal 100 are described briefly below, it should be understood that numerous other elements may exist and may be used in any number of combinations to create variation of the wagering game terminal 100.

The wager acceptors 102*a* and 102*b* may be provided in many forms, individually or in combination. For example, the cash wager acceptor 102*a* may include a coin slot acceptor or a note acceptor to input value to the wagering game terminal 100. The card wager acceptor 102*b* may include a card-reading device for reading a card that has a recorded monetary value with which it is associated. The card wager acceptor 102*b* may also receive a card that authorizes access to a central account that can transfer money to the wagering game terminal 100.

The payout mechanism 108 performs the reverse function of the wager acceptors 102*a* and 102*b*. For example, the payout mechanism 108 may include a coin dispenser or a note dispenser to dispense money or tokens from the wagering game terminal 100. The payout mechanism 108 may also be adapted to receive a card that authorizes the wagering game terminal 100 to transfer credits from the wagering game terminal 100 to a central account.

The push button panel 106 is typically offered, in addition to the touch screen 104, to provide players with an option on making their game selections. Alternatively, the push button panel 106 may facilitate player input needed for certain aspects of operating the game, while the touch screen 104 facilitates player input needed for other aspects of operating the game.

The outcome of the basic wagering game is displayed to the player on the main display 112. The main display 112 may take a variety of forms, including a cathode ray tube (CRT), a high resolution LCD, a plasma display, LED, or any other type of video display suitable for use in the wagering game terminal 100. As shown here, the main display 112 also includes the touch screen 104 overlaying the entire display (or a portion thereof) to allow players to make game-related selections. Alternatively, the wagering game terminal 100 may include a number of mechanical reels that display the game outcome.

In some embodiments, the information reader 110 is a card reader that allows for identification of a player by reading a card with information indicating the player's identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 110, which allows the casino's computers to register that player's wagering at the wagering game terminal 100. Then, the wagering game terminal 100 may use the secondary display 114 for providing the player with information about his or her account or other player-specific information. Also, in some embodiments, the information reader 110 may be used to restore assets that the player achieved during a previous gaming session and had saved.

Figure 2:
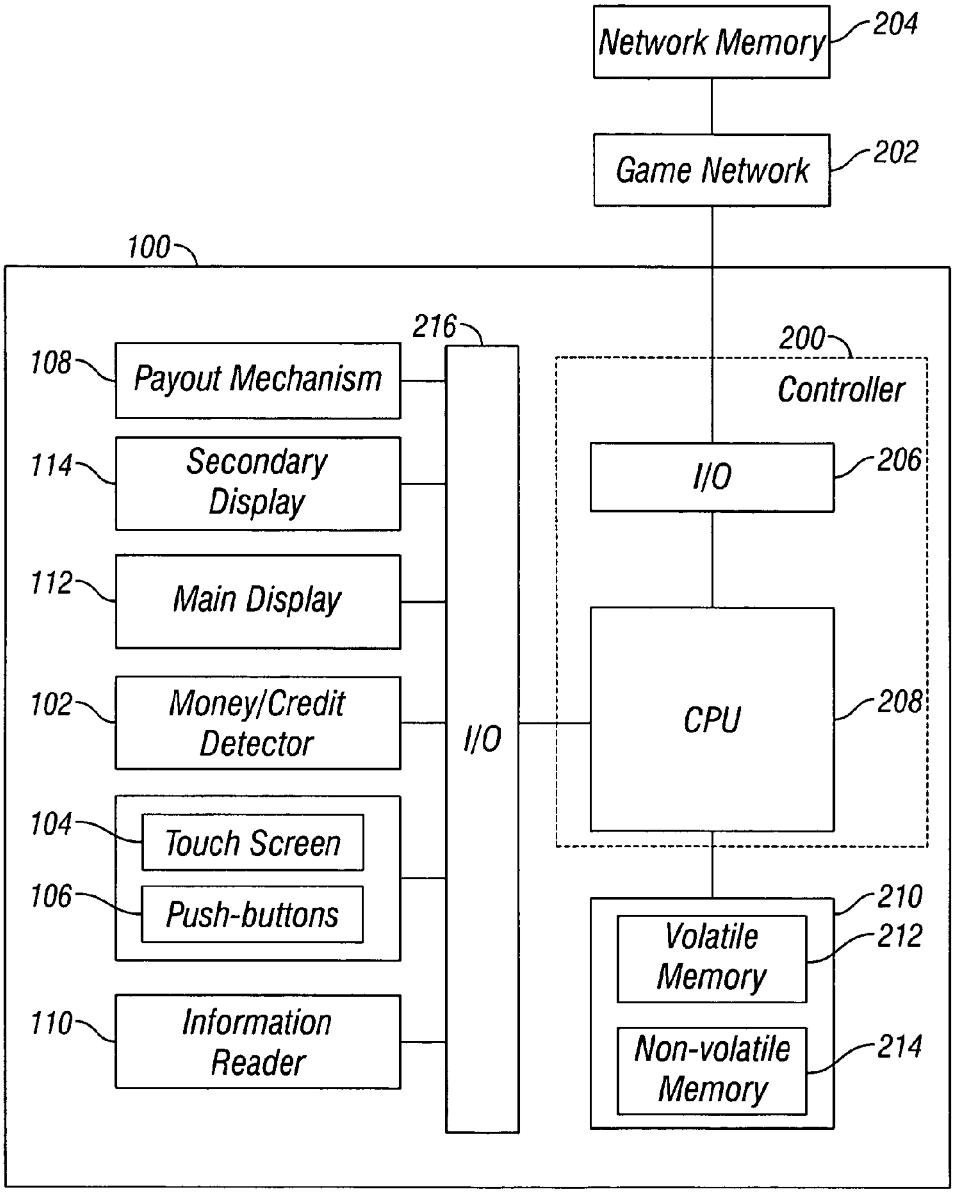
FIG. 2 illustrates the wagering game terminal of FIG. 1 in more detail.

As shown in FIG. 2, the wagering game terminal 100 and associated wagering game control system is capable of executing wagering games on or through a controller 200. The controller 200, as used herein, comprises any combination of hardware, software, and/or firmware that may be disposed or resident inside and/or outside of the wagering game terminal 100 or like machine which may communicate with and/or control the transfer of data between the wagering game terminal 100 and a bus, another computer, processor, or device, and/or a service and/or a network. Such a network is shown at 202 and may include, but is not limited to a peer-to-peer, client/server, master/slave, star network, ring network, bus network, or other network architecture wherein at least one processing device (e.g., computer) is linked to at least one other processing device. A network memory 204 is connected to the network 202 for storing data and/or information transferred over the network 202, including game status information.

The controller 200 may comprise the I/O circuits 206 and a CPU 208. In other embodiments, the CPU 208 may be housed outside of the controller 200, and a different processor may be housed within the controller 200. The controller 200, as used herein, may comprise multiple CPUs 208. In one implementation, each wagering game terminal 100 comprises, or is connected to, a controller 200 enabling each wagering game terminal 100 to transmit and/or receive signals, preferably both, in a peer-to-peer arrangement. In another example, the controller 200 may be adapted to facilitate communication and/or data transfer for one or more wagering game terminals 100 in a client/server or centralized arrangement. In one aspect, shown in FIG. 2, the controller 200 may connect the wagering game terminal 100 via a conventional I/O port and communication path (e.g., serial, parallel, IR, RC, 10bT, etc.) to the game network 202, which may include, for example, other wagering game terminals connected together in the network 202.

To provide the wagering game functions, the controller 200 executes a game program that generates a randomly selected game outcome. The controller 200 is also coupled to or includes a local memory 210. The local memory 210 may be in the form of one or more volatile memories 212 (e.g., a random-access memory (RAM)) and one or more non-volatile memories 214 (e.g., an EEPROM). Communication between the peripheral components of the wagering game terminal 100 and the controller 200 is controlled by the controller 200 through input/output (I/O) circuits 216.

Figure 3:
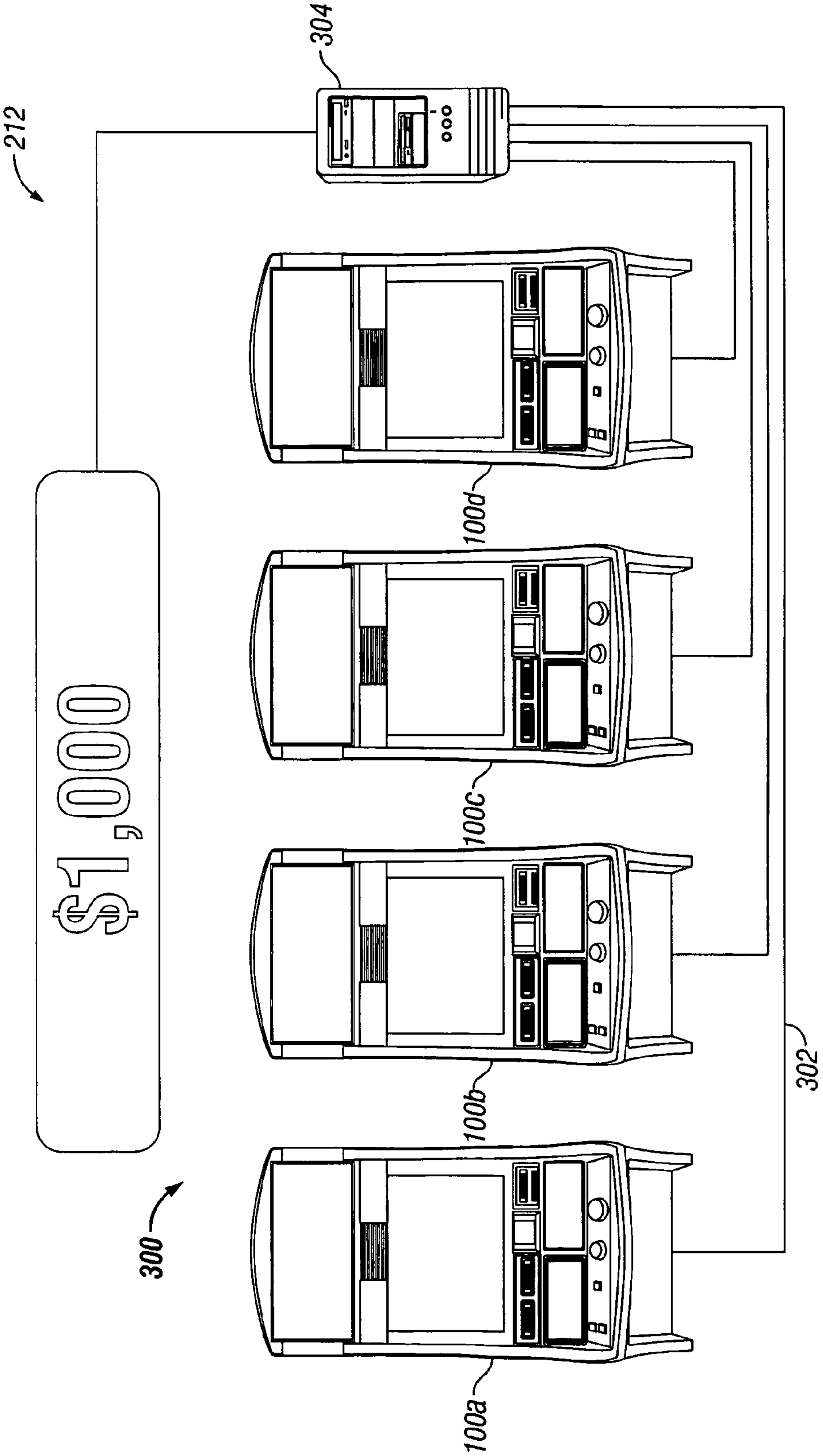
FIG. 3 illustrates a bank of wagering game terminals connected to a bank controller according to one embodiment of the invention.

As alluded to above, the wagering game terminal 100 may be a stand-alone terminal, or it may be part of a network 202 that connects multiple wagering game terminals 100 together. The network 202 may be a peer-to-peer network, a client/server network, or any other suitable network architecture. FIG. 3 illustrates an example where the network 202 is a client/server network. The network 202 includes a bank 300 of wagering game terminals 100*a*, 100*b*, 100*c*, 100*d* connected via network connections 302 (e.g., Ethernet-TCP/IP) to a bank controller 304. Although only four wagering game terminals 100*a-d* are shown here, those having ordinary skill in the art will recognize that the bank 300 may include fewer or more wagering game terminals without departing from the scope of the invention. Preferably, the wagering game terminals 100*a-d* are located close to one another to enhance the sense of competition (and camaraderie) and also to allow the players to more easily see a jackpot display 306 mounted above the wagering game terminals 100*a-d*. The jackpot display 306 displays the current bank jackpot amount, which may be either a preset amount, or it may be an unspecified amount accumulated from the wagering activity of the players at the wagering game terminals 100*a-d*.

The wagering game terminals 100*a*-100*d* are similar to the wagering game terminal 100 (FIG. 1) in that they have many of the same features and components. For example, the wagering game terminals 100*a-d* allow players to play a basic, terminal-level wagering game. Each wagering game terminal 100*a-d* may be configured to play a different basic wagering game, or they all may be configured to play the same basic wagering game. Furthermore, the wagering game terminals 100*a-d* may share a common theme, such as the PowerBall® lottery, or each wagering game terminal 100*a-d* may have its own theme that is different from the other wagering game terminals 100*a-d*.

In some embodiments, one or more functions of the wagering game terminals 100*a*-100*d* may reside on the bank controller 304 instead of, or in addition to, the wagering game terminals 100*a*-100*d*. The bank controller 304 may then conduct the basic and/or bonus games (or portions thereof) for each of the wagering game terminals 100*a*-100*d* connected to the network 202, including providing the input data and information needed to operate the basic and/or bonus games. The bank controller 304 may also control the progressive jackpots mentioned previously that are contributed to by all or some of the wagering game terminals 100*a*-100*d* in the network 202 (e.g., terminal-level jackpots that only each terminal 100*a*-100*d* contributes to, bank-level jackpots that are contributed to by all of the terminals 100*a*-100*d* in a particular bank, and wide-area jackpots that are contributed to by a larger number of terminals 100*a*-100*d*, such as multiple banks).

In addition to the basic wagering game, the wagering game terminals 100*a-d* also allow players to participate in a bank-level or group-level special event conducted by the bank controller 304. The special event, which may be a group-level bonus game, allows players at eligible wagering game terminals to compete against each other to win portions of a jackpot. Eligibility is determined based on the wager amounts or the "turnover" at the wagering game terminals 100*a-d*. The wager amounts or the turnover may be obtained as close in time to the beginning of the bonus game as possible to help ensure that only players who have actually wagered may play.

In one embodiment, eligibility is determined by periodically obtaining wager information from the wagering game terminals 100*a-d* connected to the bank controller 304. For example, the bank controller 304 may request that the wagering game terminals 100*a-d* forward their wager information to the bank controller 304 at certain intervals, such as every 30 seconds, every minute, and so forth. The wager information allows the bank controller 304 to determine whether a player was playing at a wagering game terminal 100*a-d* when the bonus game is started. This avoids unduly awarding a bonus game to a player who had not actually been playing at the wagering game terminal, but who had just stepped up to the wagering game terminal when the bonus game began.

The content of the wager information may include, for example, the wager amounts or the turnover and the time when the wagers were placed. The term "turnover" as used herein refers to the amount wagered at any wagering game terminal 100*a-d* over a predefined interval (e.g., 30 seconds, 1 minute, etc.). Eligibility is then determined based on the wager amounts or the turnover at the wagering game terminals 100*a-d*, and not on player identification. In one embodiment, players at all wagering game terminals connected to the bank controller 304 may play the bonus game regardless of their wagering activities as long as the players are currently playing at the wagering game terminals. In another embodiment, however, the bank controller 304 may have additional requirements as to which wagering game terminals (i.e., which players) are eligible. For example, the bank controller 304 may require a turnover of at least $1 per unit of time (e.g., a 30 second interval) at the wagering game terminal in order for the player to play the bonus game.

In some embodiments, instead of the bank controller 304 determining eligibility for the wagering game terminals 100*a-d*, each wagering game terminal 100*a-d* may determine its own eligibility. The bank controller 304 simply notifies the wagering game terminals 100*a-d* that a bonus game is about to begin. Each wagering game terminal 100*a-d* then determines whether it is eligible and only those wagering game terminals 100*a-d* that are eligible will inform their respective players of the opportunity to participate in the bonus game. The wagering game terminals 100*a-d* that are not eligible will simply ignore the notification from the bank controller 304.

The period in which eligibility is considered may be the same as the turnover interval in embodiments where eligibility is contingent upon a minimum turnover level. For other embodiments where a minimum turnover level is not required, the eligibility period is not necessarily the same as the turnover interval and may be longer or shorter. In either case, the eligibility period may be defined so that it expires before the bonus game begins. Then, a new eligibility period may start either immediately after the previous eligibility period expires (i.e., without any break in between), or it may begin some predetermined amount of time after the previous eligibility period expires. In some embodiments, the eligibility period may be defined simply as, for example, a 30-second or one-minute interval immediately preceding the beginning of the bonus game, regardless of the frequency or timing or the bonus game.

Thus far, eligibility has been discussed irrespective of the identity of the player or the type of terminal-level wagering games conducted by the wagering game terminals 100*a-d*. However, in some embodiments, eligibility may be determined by using the player's identification to track accumulated wagers on the wagering game terminals 100*a-d*. In that case, the player's identification may be read via the player-identification card reader 110 (FIGS. 1-2) and used to monitor the wagers. If the player has accumulated a certain minimum wager amount over a predetermined time period, then he or she may play the bonus game. The player's identification may be further used for other activities, such as awarding monthly prizes and so forth.

Figure 4:
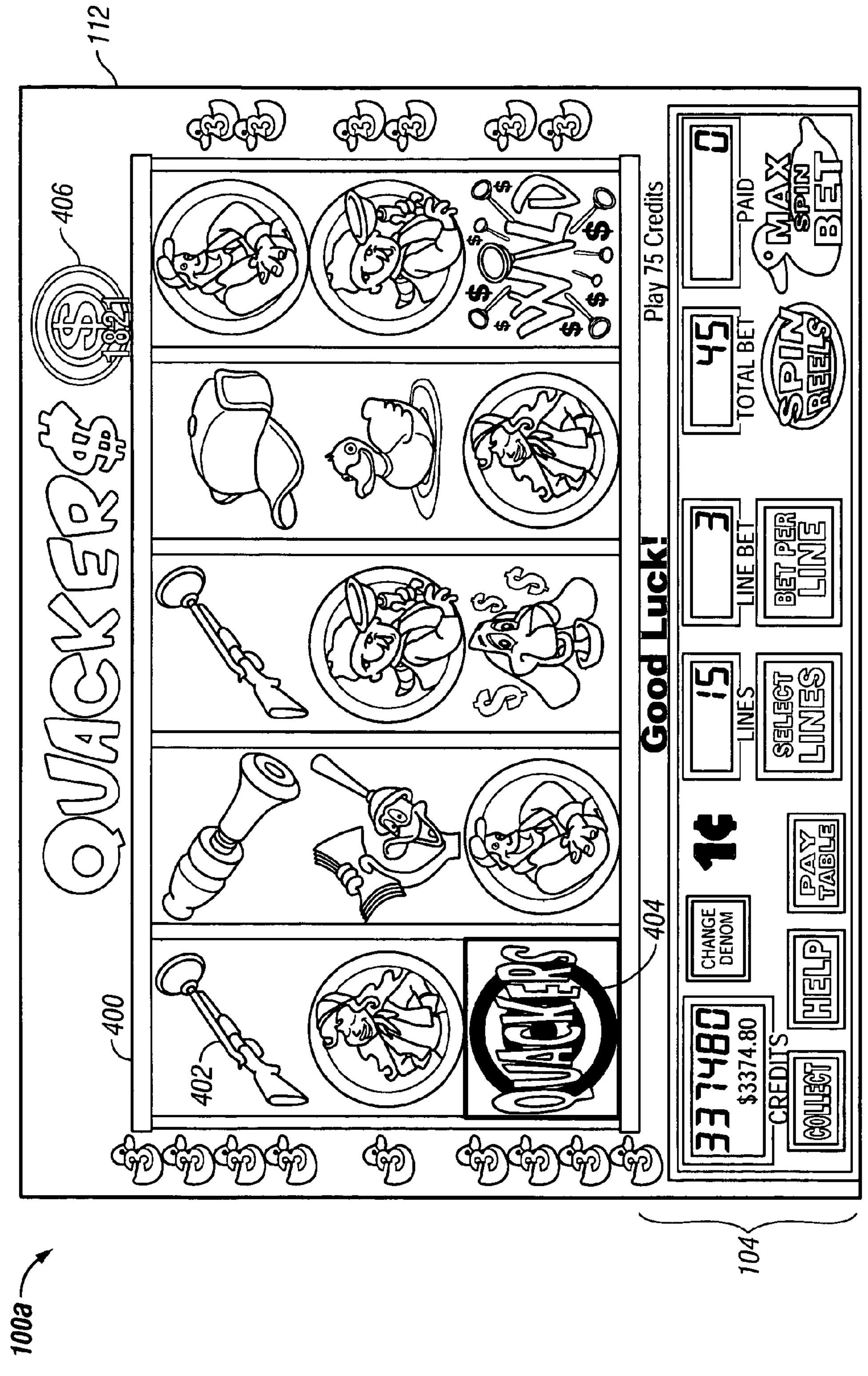
FIG. 4 illustrates a main screen at one of the wagering game terminals in the bank of wagering game terminal according to one embodiment of the invention.

Operation of the above exemplary bank 300 of wagering game terminals is described with respect to FIGS. 4 and 5A-5C. FIG. 4 illustrates the main display 112 of one of the wagering game terminals 100*a-d*, for example the first wagering game terminal 100*a*. Shown on the main display 112 is a basic wagering game, for example, a video slot machine game having a "Quackers" theme. Touch screen buttons 104 allow players to place bets, select paylines, and otherwise control the wagering game terminal 100*a*. The video slot machine game includes a plurality of reels, one of which is indicated at 400. Each reel 400 contains several symbols 402, including a special-event symbol 404, which may be a "Quackers" symbol or some other symbol. The occurrence of the special-event symbol 404 on one of the paylines in the video slot machine game triggers a special event, such as a bonus game, on all eligible wagering game terminals 100*a-d* on the bank 300 of wagering game terminals.

During the course of normal play, the bank controller 304 periodically assesses the wagering game terminals 100*a-d* on their level of turnover. As mentioned earlier, turnover refers to the amount of money wagered at the wagering game terminal over a predetermined interval (e.g., 30 seconds, one minute, etc.). Wagering game terminals 100*a-d* that have a level of turnover exceeding a minimum eligibility requirement receive an eligibility indicator on the main display 112. In the example shown, the eligibility indicator may be in the form of a virtual token 406 that also serves to identify the wagering game terminal, for example, via a terminal number (e.g., number 1821). The virtual tokens 406 may also indicate the level of turnover, for example, by using different color virtual tokens 406 to reflect different levels of turnover at each wagering game terminal 100*a-d*.

When the special-event symbol 404 occurs on one of the paylines, a special event, such as a bonus game, is triggered on the wagering game terminals 100*a-d*. In accordance with one embodiment of the invention, the bonus game is one in which all participating players take a turn playing. Thus, only one player can play at a time and each player sees the same bonus game as all other participating players, including all sequences and actions that may occur during the bonus game. With each turn, the players have an opportunity to win a portion of the jackpot, or they may be terminated from the bonus game.

The jackpot may be a preset, recurring amount (e.g., $1,000), or it may be an unspecified amount that is based on the "expected value" of the wagers placed and revealed at the start of each bonus game. The portion of the jackpot won by each player may be equal to the actual face value amount won by the player, or it may be a percentage of the entire jackpot based on the actual face value amount won by the player relative to other players. In the latter case, for example, if there are three participating players and one player wins $100 while the other two players win $50, then the first player's portion would be half of the entire jackpot (e.g., $500) and the other two players would split the remaining half. The bonus game is concluded when the entire jackpot has been apportioned, when all players have been terminated, or when some other condition is satisfied (e.g., a time limit has expired).

Figure 5A:
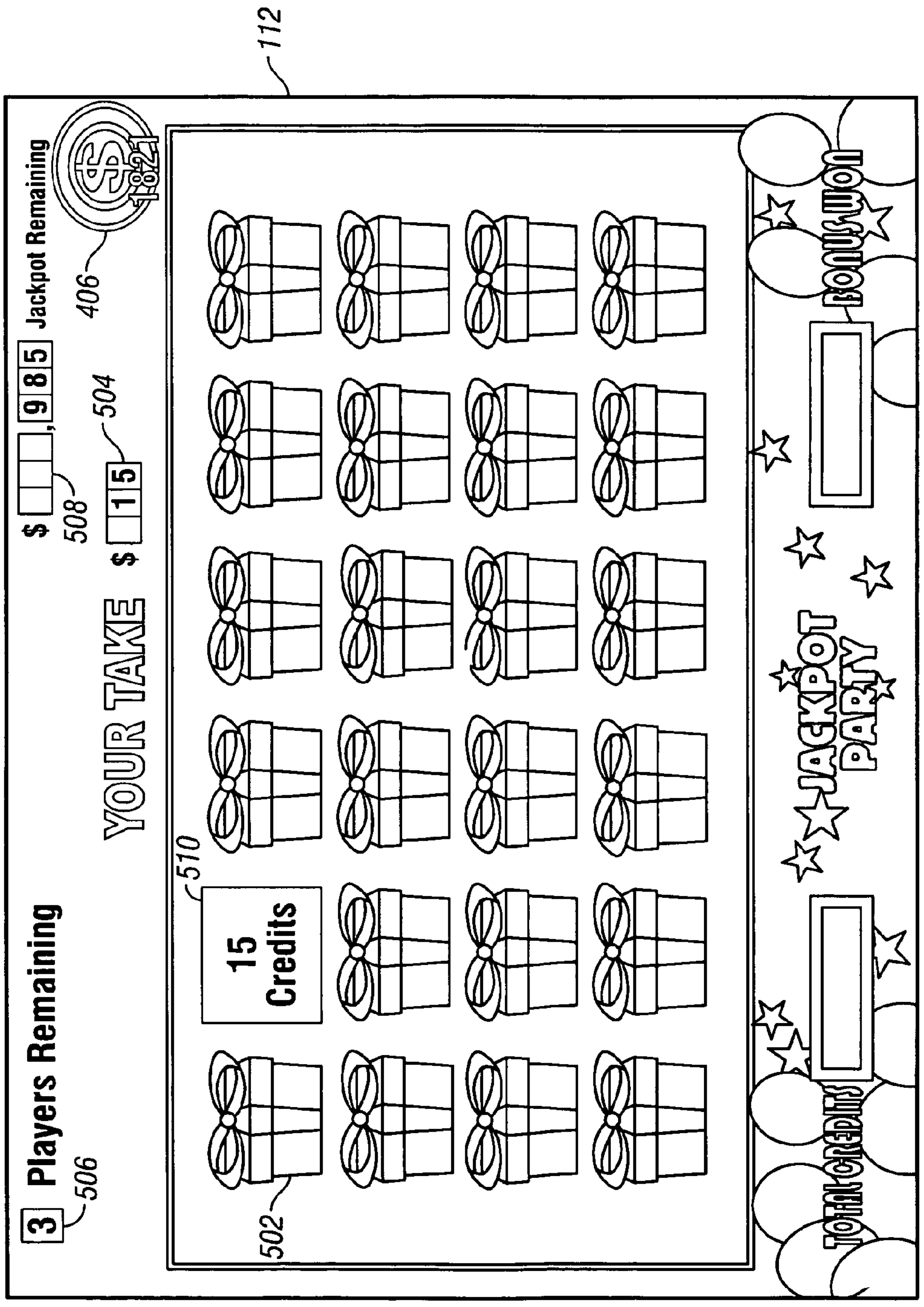
FIGS. 5A-5C illustrate an exemplary bonus game that may be played at the wagering game terminals in the bank of wagering game terminals.
Figure 5B:
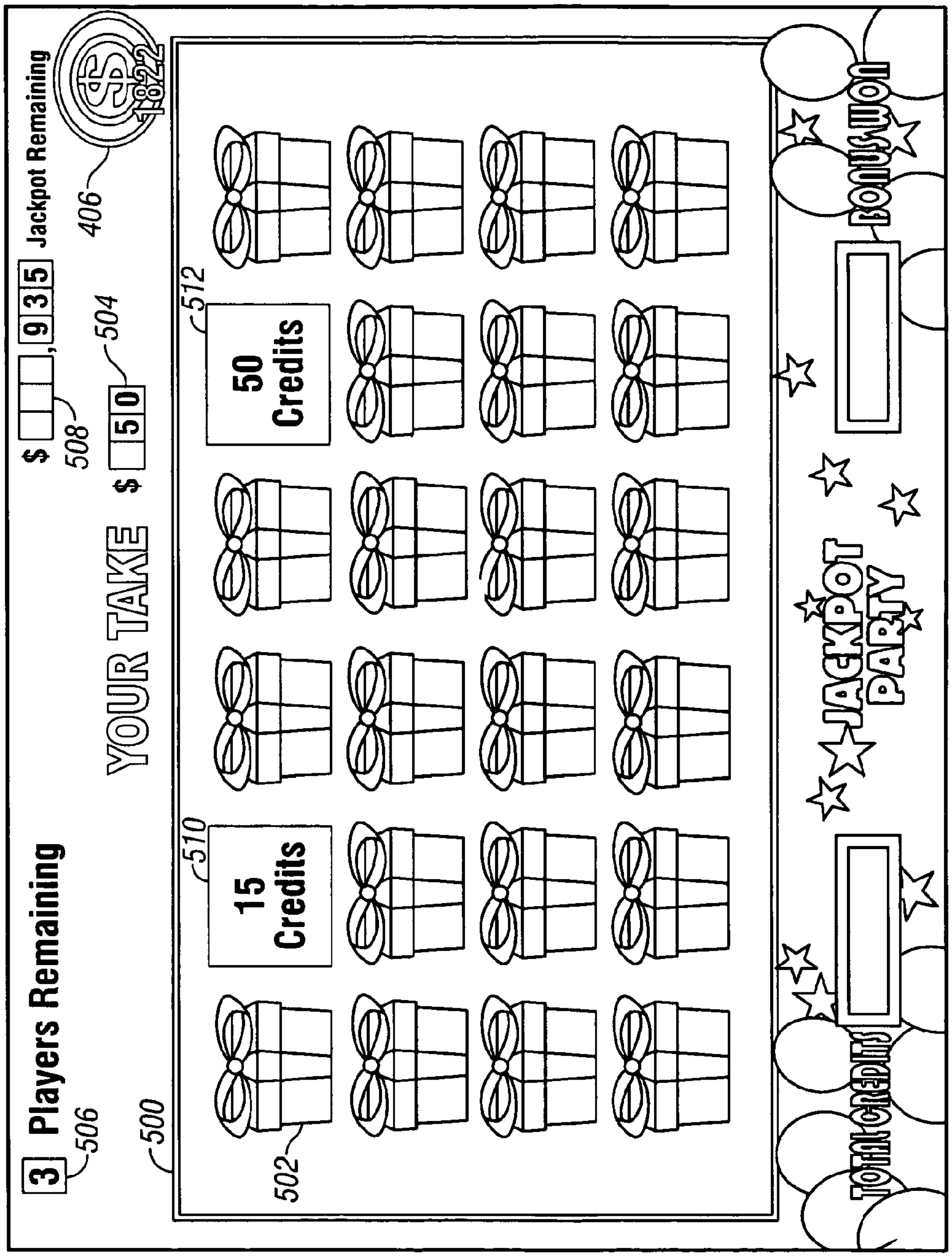
Figure 5C:
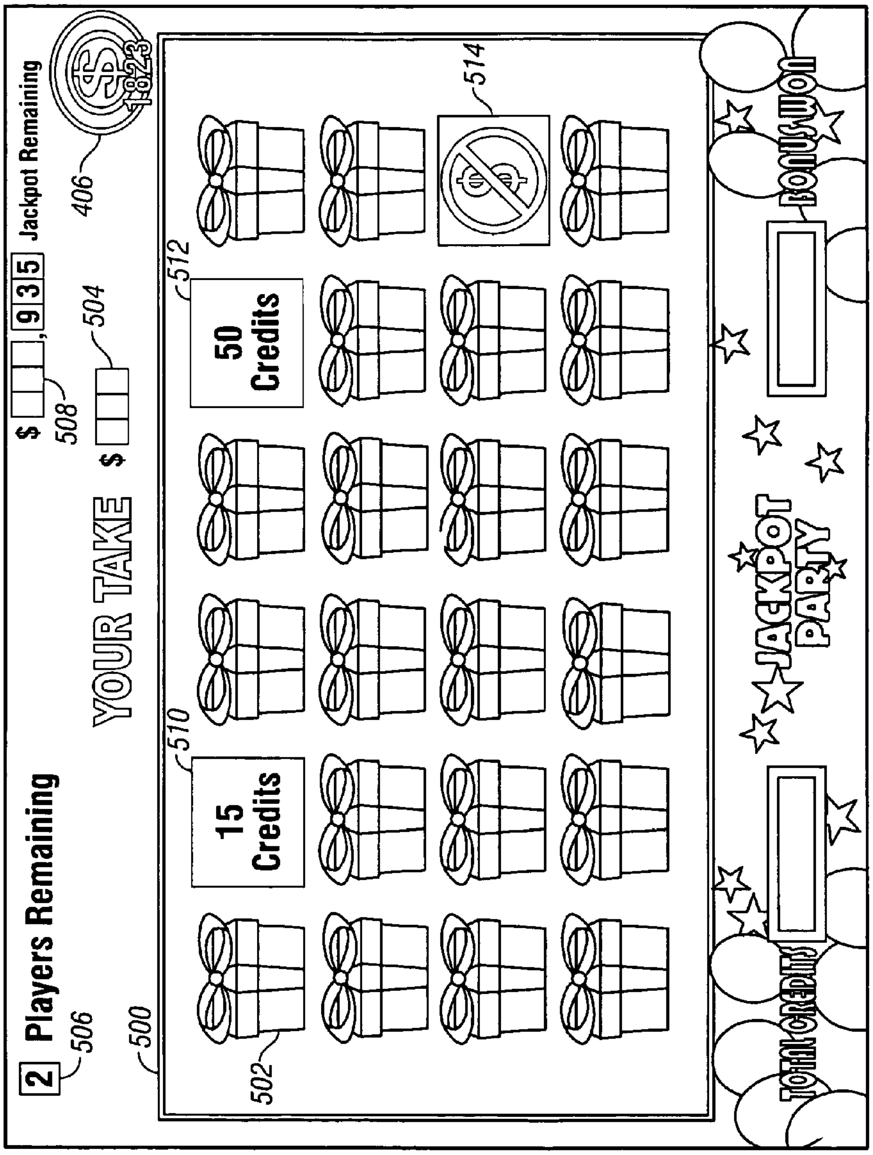

FIGS. 5A-5C illustrate an exemplary bonus game according to one embodiment of the invention. The bonus game may be displayed on the main display 112, or it may be displayed on the secondary display 114 of the wagering game. Regardless of which display 112 or 114 is used, the same player-selection bonus game is displayed to all participating players. Such a group-level bonus game may be conducted by the bank controller 304 where, as here, the network 202 is a client/server network, or it may be conducted by the wagering game terminals 100*a-d* themselves in coordination with one another over a peer-to-peer network.

As can be seen, the bonus game may be a player-selection game where participating players are presented with an array 500 of picks 502 from which they may select. In the current embodiment, the picks 502 are in the form of gift-wrapped presents, although other themes may certainly be used. Each pick 502 reveals either a prize, such as a credit amount, or a game-termination symbol when selected. The number of picks 502 that are credit amounts versus game-termination symbols may vary from round to round of the bonus game and may depend, in part, on the available jackpot amount. In one embodiment, those picks 502 that are credit amounts represent all of the available jackpot, with the remaining picks 502 in the array 500 being game-termination symbols. The distribution of the picks 502 that are credit amounts may be random both in terms of their location in the array 500 as well as their face value amounts.

A player-winnings indicator 504 on each wagering game terminal 100*a-d* indicates the amount of credits that the player has won. Similarly, a players-remaining indicator 506 on each wagering game terminal 100*a-d* indicates the number of players who are still playing the bonus game. Finally, a jackpot-remaining indicator 508 indicates the amount remaining in the jackpot. These indicators 504, 506, and 508 may be in any suitable form (e.g., a counter, a meter, etc.) and are frequently and automatically updated to reflect the latest available information. It is of course possible to omit one or more of the indicators 504, 506, and 508, for example, the jackpot-remaining indicator 508, to introduce more uncertainty (and hence, more excitement) into the game.

In operation, the virtual token 406 on the display 112 flashes, glows, or otherwise indicates to the player that he or she should make a selection. In FIG. 5A, for example, the virtual token 406 for wagering game terminal number 1821 rotates (i.e., like a spinning coin) to indicate to the player that he or she should make a selection. The player may thereafter select one of the available picks 502. Here, the player has selected the second pick 510 from the left on the top row to reveal a prize of 15 credits. This credit amount is then added to the player-winnings indicator 504 and subtracted from the jackpot-remaining indicator 508. The player's current turn is ended at this point and the player at the next wagering game terminal is given a turn.

FIG. 5B shows the bonus game as it appears on the display 112 of another wagering game terminal (e.g., number 1822) on the bank 300. Since the same bonus game is displayed on the wagering game terminals of all participating players, the player at this wagering game terminal can see that the second pick 510 from the left on the top row has been selected and is no longer available. At this point, the virtual coin 406 on the wagering game terminal number begins to spin or otherwise notify the player that he or she should make a selection. The player here subsequently selects the second pick 512 from the right on the top row, revealing a prize of 50 credits. This credit amount is added to the player-winnings indicator 504 and subtracted from the jackpot-remaining indicator 508 of all participating wagering game terminals.

FIG. 5C shows the bonus game on the display 112 of yet another wagering game terminal (e.g., number 1823) on the bank 300. As can be seen, the two previously selected picks 510 and 512 have both been updated on this wagering game terminal along with the player-winnings indicator 504 and the jackpot-remaining indicator 506. The virtual token 406 on this wagering game terminal now begins to notify its player that he or she may make a selection. Unfortunately, the player here selects the second pick 514 from the right on the top row, revealing a game-termination symbol. This player is subsequently returned to the basic wagering game he or she was playing previously and the players-remaining indicator 506 is updated to reflect one fewer player remaining.

In some embodiments, each participating player is given a limited amount of time in which to make his or her selection to avoid one player holding up the other players. Thus, for example, an hourglass or some other time indicator may be displayed on the wagering game terminals to inform the players of the amount of time remaining in their turns. If the player fails to make a selection within his or her allotted time, then the player forfeits the turn and the bonus game moves on to the player at the next eligible wagering game terminal.

The sequence or order in which players at eligible wagering game terminals take turns may depend, for example, on the turnover at each wagering game terminal. In one embodiment, players at wagering game terminals with a higher turnover may select ahead of players at wagering game terminals with a lower turnover. In this way, players who wager more are rewarded with an earlier turn. If there is a tie in the turnover, then the ordering may be determined either randomly or by using a predetermined tiebreaker (e.g., most recent two turnovers, etc.). Aside from the picking order, however, all participating players are on substantially equal footing in terms of the likelihood of selecting a credit amount versus a game-termination symbol. An exemplary picking order is shown below in TABLE 1.

TABLE 1

| Turnover | Virtual Token | Picking Order |
|---|---|---|
| \$0-\$2.50 | Bronze Coin | 3rd |
| \$2.51-\$5.00 | Silver Coin | 2nd |
| \$5.01-\$10.00 | Gold Coin | 1st |

In TABLE 1, if a wagering game terminal has more than \$10 of turnover, its player will be given more than one virtual coin (e.g., gold and silver coins for \$13 turnover) and will be allowed to pick ahead of players at wagering game terminals with lower turnover.

In some cases, the picking order may be determined randomly for each round so that all participating players have a substantially equal chance of selecting early. Then, players at wagering game terminals with higher turnover may be given two or more consecutive picks, depending on the turnover level at their wagering game terminals, if there is a desire to reward these players. Other ways of rewarding players may include, for example, multiplying their winnings by a predetermined multiplier based on the turnover at their wagering game terminals.

At the conclusion of the bonus game, each participating player keeps the credit amounts that he or she has won. Thus, while all participating players have an opportunity to win, some players may win more than others. However, due to the random distribution of the picks 502, the credit amounts won by the players, if any, will typically depend more on chance than on any skill the players may have applied. In one embodiment, the player who wins the most may be given an additional prize, for example, a doubling of his or her winnings.

The bonus game is concluded when either all participating players have been terminated, or when all credit amounts have been uncovered (meaning the entire jackpot has been apportioned). It is also possible to conclude the bonus game based on some other condition, for example, when a predetermined time period has expired (e.g., 10 minutes), or when all participating players have completed a certain number of turns (e.g., 1, 2, 3 turns, etc.). Any jackpot amount remaining at the conclusion of the bonus game may be carried over to the next bonus round or otherwise factored into the basic wagering game as “expected value.”

Although the bonus game has been described thus far in terms of players taking turns, in some embodiments, it is possible for all players to play at the same time. In that case, the players may play the bonus game at their own pace and are not confined to taking turns. Where the bonus game is a player-selection game, players who are able to pick more quickly may be able to acquire more picks than other players. By the same token, the faster players may also be more likely to pick a game-termination symbol and thereby eliminate some of the game-termination symbols for the slower players (recall that all players play the same bonus game). In the unlikely event two players make the same pick at the same time, the bank controller 304 may execute a conflict resolution algorithm to decide which player should have the pick. For example, the bank controller 304 may choose one of the players randomly, or the player at the wagering game terminal with a higher turnover may be given the pick.

Sometimes, a bonus game may be initiated while a wagering game terminal is in the middle of a basic wagering game. When that happens, the wagering game terminal may freeze or suspend the basic wagering game while the player plays the bonus game, then resume the basic wagering game when the bonus game is concluded.

Figure 6:
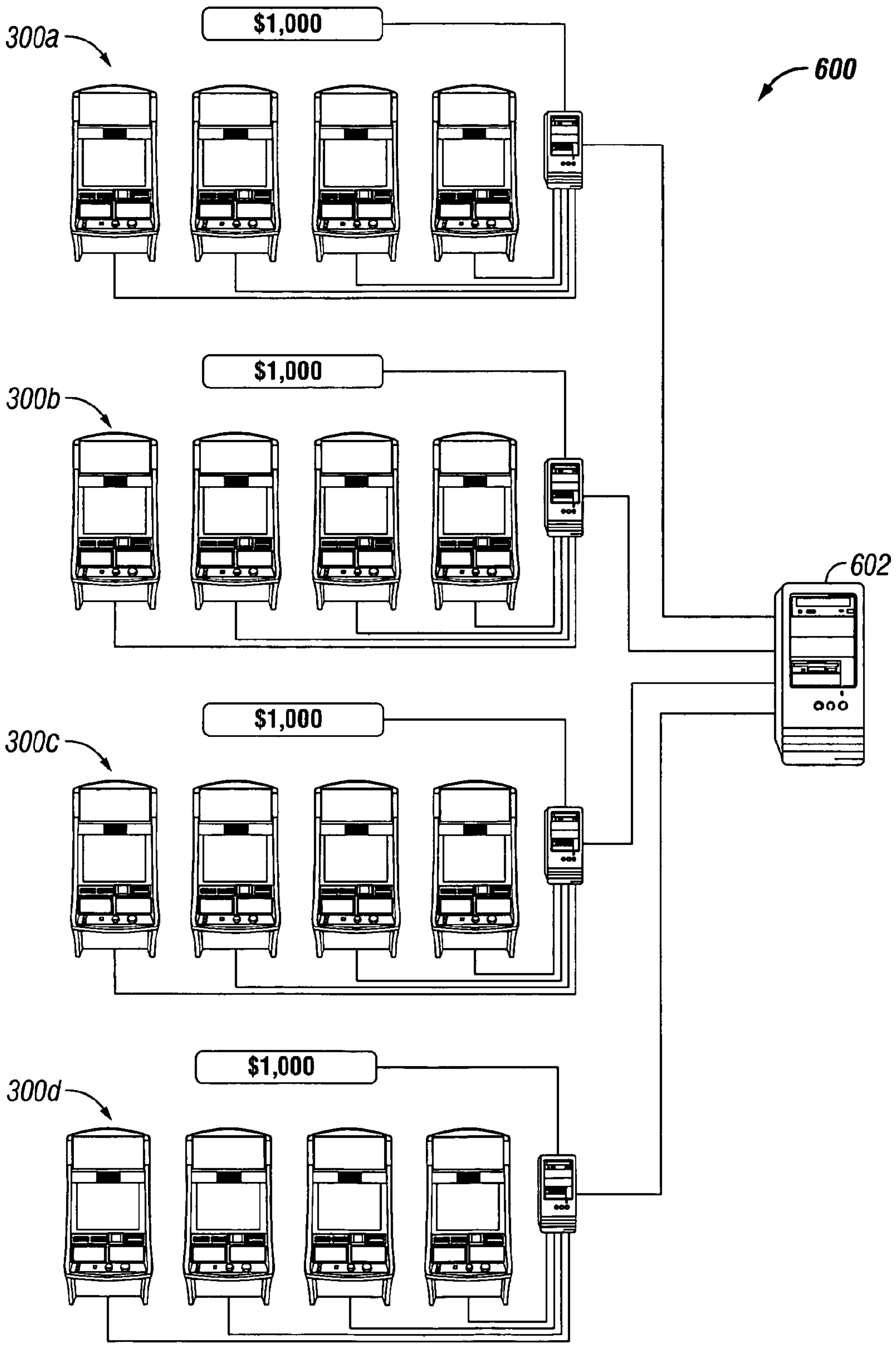
FIG. 6 illustrates several banks of wagering game terminals connected together to form a super bank according to one embodiment of the present invention.

While only a single game bank 300 (FIG. 3) has been described thus far, in some embodiments, it is possible to link several game banks together over a LAN or WAN to form a super bank 600, such as the one shown in FIG. 6. As can be seen, the super bank 600 is composed of several game banks 300*a-d*, each having its own bank controller, that are connected to a super bank controller 602. The super bank 600 operates in a similar way to the game bank 300 of FIG. 3, except that it conducts a bonus game involving players at multiple game banks 300*a-d*.

To determine eligibility, wager information is provided periodically from the game banks 300*a-d* to the super bank controller 602. Eligibility is again based on the wager amounts or the turnover at the wagering game terminals, irrespective of player identity or the types of game played at the wagering game terminals. It is also possible to determine eligibility on a per bank basis instead of a per wagering game terminal basis so that all wagering game terminals at a game bank 300*a-d* may be eligible based on the total wager amounts or the total turnover for the game bank 300*a-d*.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A wagering game system, comprising:

a plurality of wagering game terminals, each wagering game terminal conducting a wagering game in which an outcome is randomly selected from a plurality of outcomes, each wagering game terminal including a display that displays the outcome; and a network to which said wagering game terminals are connected, said network initiating a special-event game on eligible ones of said wagering game terminals upon occurrence of a special-event outcome;

wherein said special-event game allows a player at one of said eligible wagering game terminals to take turns playing with at least one other player at another eligible wagering game terminal to win, during each turn, a portion of a same jackpot, said player competing against said at least one other player for portions of said same jackpot, said portions of said same jackpot being awarded during said corresponding turns, said jackpot decreasing as said portions are awarded during said corresponding turn, and wherein said display at each eligible wagering game terminal displays a jackpot-remaining indicator that shows said jackpot as said jackpot decreases.

2. The wagering game system according to claim 1, wherein said special-event game includes a player-selection game in which players take turns selecting picks from an array of picks, each pick revealing a credit amount or a game-termination symbol when selected.

3. The wagering game system according to claim 2, wherein said jackpot is distributed as random credit amounts and at random locations in said array of picks.

4. The wagering game system according to claim 1, wherein said special-event game is concluded when all players at eligible ones of said wagering game terminals have been terminated.

5. The wagering game system according to claim 1, wherein said special-event game is concluded when all portions of said jackpot have been won and said jackpot-remaining indicator is decreased to zero.

6. The wagering game system according to claim 1, wherein said special-event game is concluded when each player at said eligible ones of said wagering game terminals has completed a predetermined number of turns.

7. The wagering game system according to claim 1, wherein said wagering game is a slot machine game and said special-event outcome includes a special symbol on said slot machine game.

8. A wagering terminal, comprising:

a wager input for accepting a wager from a player at said wagering game terminal; and a display for displaying a wagering game, said wagering game having an outcome that is randomly selected from a plurality of outcomes, said plurality of outcomes including a special-event outcome;

wherein said special-event outcome triggers a special-event game on said wagering game terminal in which said player alternates turns playing with other players at other wagering game terminals to win, during each turn, a portion of a same jackpot, said portion of said same jackpot being awarded during said corresponding turn, said jackpot decreasing as said portion is awarded during said corresponding turn, and wherein said display displays a jackpot-remaining indicator that shows said jackpot as said jackpot decreases.

9. The wagering terminal according to claim 8, wherein said special-event game includes a player-selection game in which players take turns selecting picks from an array of picks, each pick revealing a credit amount or a game-termination symbol when selected.

10. The wagering terminal according to claim 9, wherein said jackpot is distributed as random credit amounts and at random locations in said array of picks.

11. The wagering terminal according to claim 8, wherein said special-event game is concluded when all players at said wagering game terminals have been terminated.

12. The wagering terminal according to claim 8, wherein said special-event game is concluded when all portions of said jackpot have been won and said jackpot-remaining indicator is decreased to zero.

13. The wagering terminal according to claim 8, wherein said special-event game is concluded when each player at said wagering game terminals has completed a predetermined number of turns.

14. The wagering terminal according to claim 8, wherein said wagering game is a slot machine game and said special-event outcome includes a special symbol on said slot machine game.

15. A method of apportioning a same jackpot amongst multiple wagering game terminals, comprising:

conducting a wagering game on said wagering game terminals, each wagering game having an outcome that is randomly selected from a plurality of wagering game outcomes, said plurality of wagering game outcomes including a special-event outcome;

displaying said special-event outcome on one of the wagering game terminals, said special-event outcome being randomly selected from said plurality of wagering game outcomes;

upon occurrence of said special-event outcome being displayed on one of the wagering game terminals, initiating on eligible ones of said wagering game terminals a special-event game in which a player at one of said eligible wagering game terminals takes turns playing against at least one other player at another eligible wagering game terminal to win, during each turn, a portion of a same jackpot, a portion of a same jackpot, each turn having a turn outcome, and displaying each turn outcome on said eligible wagering game terminals; and upon occurrence of a winning turn outcome, awarding said player a portion of said jackpot during said player's turn playing said special-event game, said jackpot decreasing by said portion of said jackpot, and displaying a jackpot-remaining indicator that shows said jackpot as said jackpot decreases.

16. The method according to claim 15, wherein said special-event game includes a player-selection game in which players take turns selecting picks from an array of picks, each pick revealing a credit amount or a game-termination symbol when selected.

17. The method according to claim 16, wherein said jackpot is distributed as random credit amounts and at random locations in said array of picks.

18. The method according to claim 15, wherein said special-event game is concluded when all players at eligible ones of said wagering game terminals have been terminated.

19. The method according to claim 15, wherein said special-event game is concluded when all portions of said jackpot has been won and said jackpot-remaining indicator is decreased to zero.

20. The method according to claim 15, wherein said special-event game is concluded when each player at said eligible ones of said wagering game terminals has completed a predetermined number of turns.

* * * * *